United States Patent [19]

Tinker

[11] 4,027,359

[45] June 7, 1977

[54] WIRE COME-ALONG

[76] Inventor: Kenneth Dale Tinker, P.O. Box 1123, Flagstaff, Ariz. 86001

[22] Filed: Oct. 28, 1975

[21] Appl. No.: 626,087

[52] U.S. Cl. .......................... 24/115 R; 24/136 R; 403/211

[51] Int. Cl.² .................. F16G 11/00; F16B 11/00

[58] Field of Search ........... 254/134.3 R, 134.3 FT, 254/134.3 PA, 29, 29 A; 24/81 PE, 81 G, 268, 136 A, 136 B, 136 L, 136 K, 249 DP, 115 B, 115 L, 115 M, 115 R, 136 R; 403/211, 374, 409; 294/102 R, 102 A

[56] References Cited

UNITED STATES PATENTS

| 319,591 | 6/1885 | Magee | 24/136 R |
|---|---|---|---|
| 523,273 | 7/1894 | Fouts | 24/136 R UX |
| 544,481 | 8/1895 | Dennis | 24/115 R |
| 944,141 | 12/1909 | Mounts | 24/136 R |
| 1,215,350 | 2/1917 | Dietrich | 294/102 R X |
| 1,229,408 | 6/1917 | Bullum | 24/136 R |
| 1,401,494 | 12/1921 | Rhorer et al. | 24/136 R |
| 1,644,376 | 10/1927 | Haworth | 403/211 |
| 1,660,258 | 2/1928 | Cushing | 254/29 R |

FOREIGN PATENTS OR APPLICATIONS

| 405,524 | 11/1924 | Germany | 24/115 M |

*Primary Examiner*—Paul R. Gilliam
*Assistant Examiner*—K. Downey
*Attorney, Agent, or Firm*—Cahill, Sutton & Thomas

[57] ABSTRACT

A split hinged sleeve circumscribingly engages a substantial length of stranded aluminum cable and includes a plurality of diametrically opposed wedges extending laterally from the sleeve. The sleeve is mounted within a frame having bearing surfaces contacting each of the wedges. On exerting a pulling force upon the frame, which force is resisted by the cable, the bearing surfaces act upon the respective wedges to force the sleeve to grip the cable and place the cable in tension.

10 Claims, 5 Drawing Figures

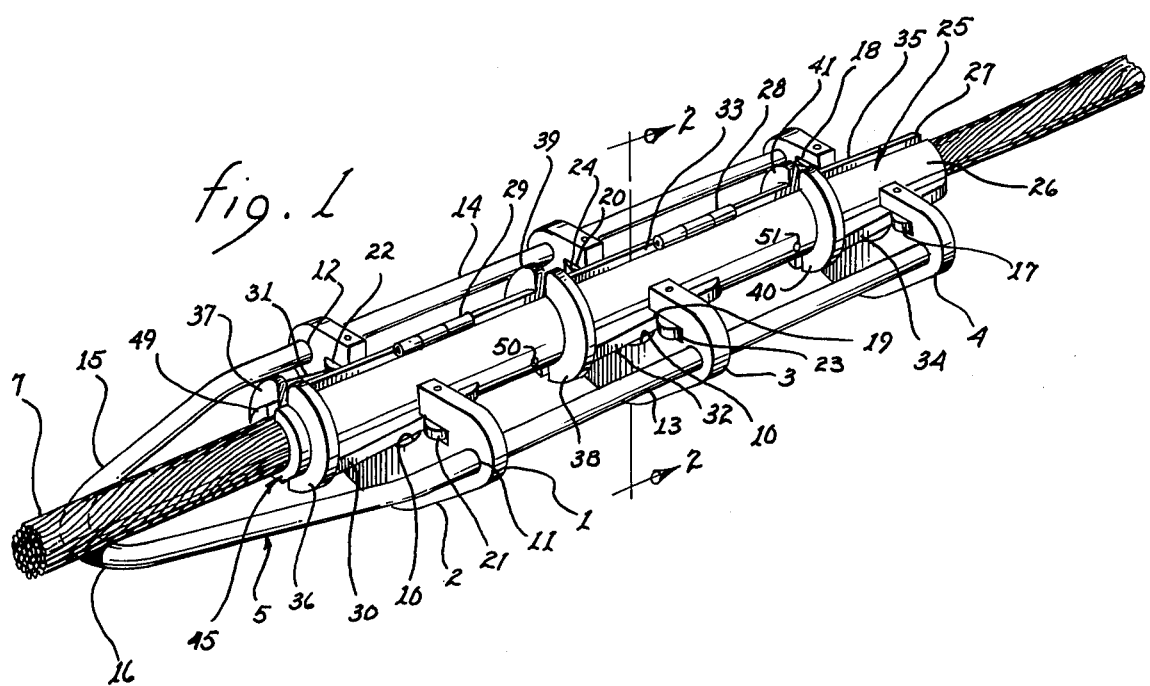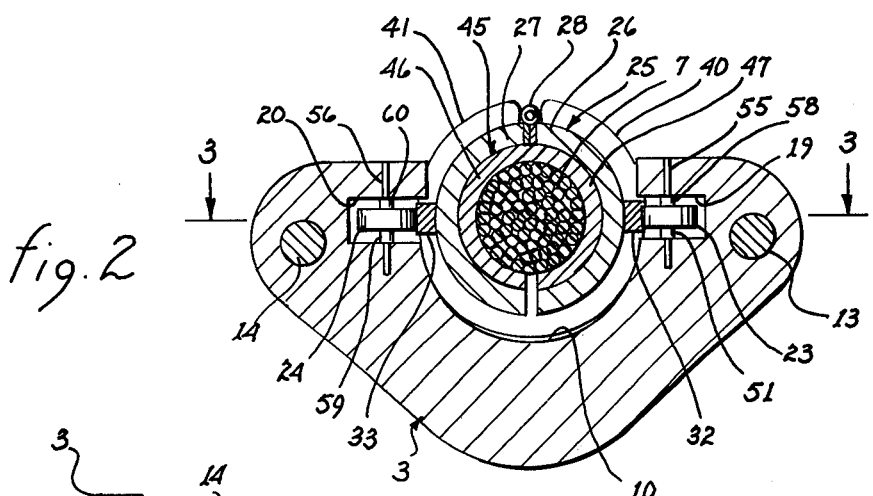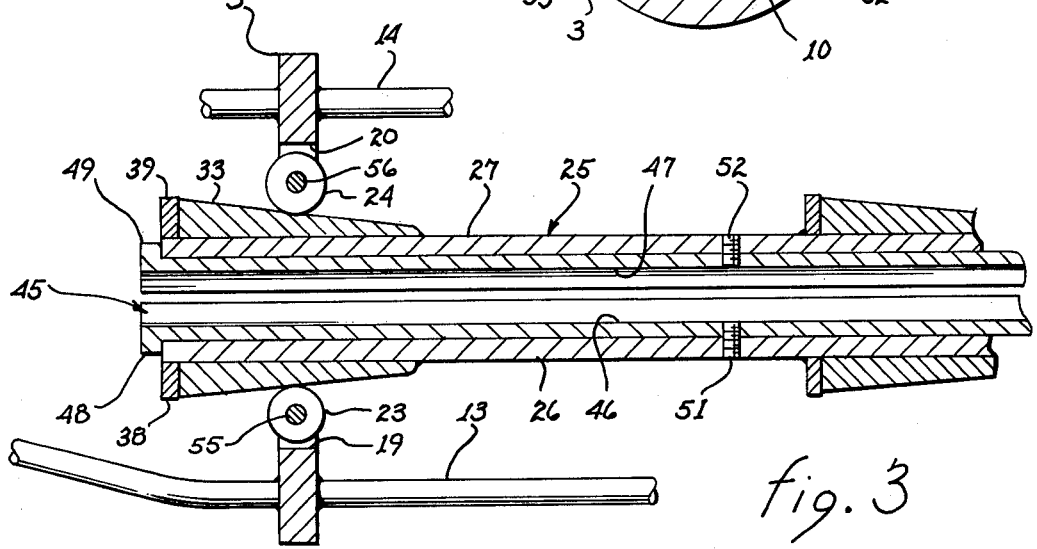

WIRE COME-ALONG

The present invention relates to a wire gripping devices and, more particularly, to wire come-alongs for stranded cable.

Wire grips, per se, have been used for a number of years to lay structural cables or electrically conducting wires. The prior art wire grips generally conform to one or another of the following types. Bolt-on grip: a two-piece grip is bolted onto a cable to provide an attachment point for a pulling force. Such a grip may cause damage to the cable by improper torquing of the bolts; it may present a hazard through cable slippage because of damaged or dirty bolt threads; and, it is generally not useable with soft cable, such as aluminum cable, Moreover, the attachment and the attachment process are generally time consuming. Wedge grip: a pair of wedges are mounted within a frame and bear directly upon opposed side surfaces of the cable; the cable contacting surfaces of the wedges may include abrasions or teeth to aid in preventing cable slippage. The contacting surface area between the cable and the wedges is generally relatively small and produces high stress concentrations which may result in damage to the cable. The opposed wedges are physically incapable of circumscribingly distributing the applied forces about the cable, which distribution tends to induce deformation of the cable. For cables of soft material, such as aluminum, physical damage generally always results which reduces the cable strength and where such cable is used to conduct electricity, creates impedance discontinuities and attendant power losses. Wire end grips: these grips are specifically configured to grip the end of the cable and are incapable of being attached at any other point along a cable.

The following United States patents are representative of one or another of the above types of wire grips: U.S. Pat. Nos. 482,975, 1,029,345, 1,504,087, 1,854,140, 2,386,908, 3,343,808, 3,776,586, 3,852,850 and 3,868,748.

It is a primary object of the present invention to provide a wire come-along for applying tension to a stranded cable without flattening or damaging the strands of the cable.

Another object of the present invention is to provide a wire come-along for stranded aluminum cable.

Yet another object of the present invention is to provide a wire come-along which exerts an equal circumferentailly distributed pressure about a substantial length of a cable.

Still another object of the present invention is to provide a wire come-along attachable to any one of a plurality of different sized wires by substituting differently sized inserts within the wire come-along.

A further object of the present invention is to provide a quickly and easily attachable and detachable wire come-along.

A still further object of the present invention is to provide a relatively lightweight wire come-along useable in conjunction with any sized cable.

These and other objects of the present invention will become apparent to those skilled in the art as the description thereof proceeds.

The present invention may be described with greater specificity and clarity with reference to the following figures, in which:

FIG. 1 is a perspective view of the wire come-along mounted upon a stranded cable.

FIG. 2 is a cross-sectional view of the wire come-along taken along lines 2—2, as shown in FIG. 1.

FIG. 3 is a partial cross-sectional view of the wire come-along taken along lines 3—3, as shown in FIG. 2.

Figure 4:
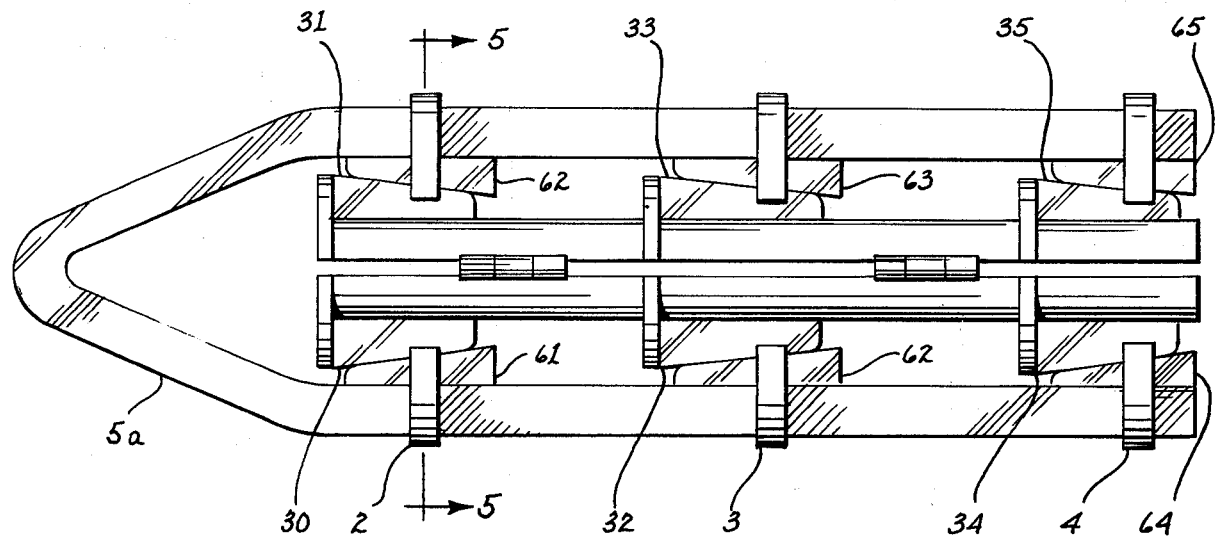
FIG. 4 illustrates the top view of a further embodiment of the wire come-along.
Figure 5:
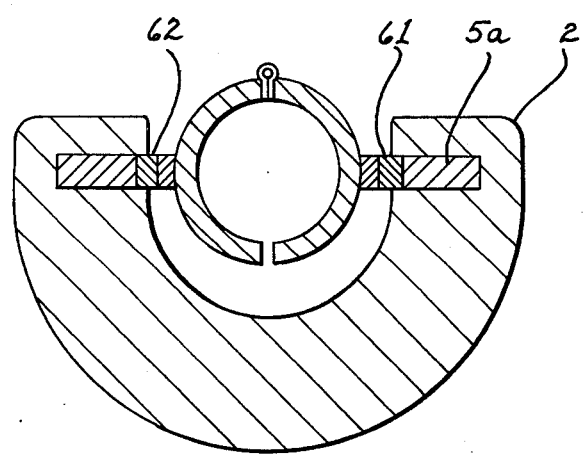
FIG. 5 is a cross-sectional view taken along lines 5—5, as shown in FIG. 4.

The salient features of the wire come-along are generally illustrated in FIG. 1 and details thereof are depicted in FIGS. 2 and 3. Frame 1 is formed by a plurality of bridges, such as bridges 2, 3, and 4, mounted upon a U-shaped rod member 5. The bridges may be isosceles triangular shaped in plan form and include a depression 10 extending inwardly from the base of the triange. Each of the bridges includes a pair of opposed slots 19 and 20 extending laterally away from depression 10. These slots house and support roller bearing surfaces 21 and 22. Apertures 11 and 12 are disposed in proximity to opposed corners of the bridges, which apertures are configured to receive respective arms 13 and 14 of rod member 5. The bridges are mounted upon arms 13 and 14 and welded thereto in general alignment with one another but spaced apart from one another, as illustrated. The central section 15, including apex 16, of rod member 5, is bent with respect to the axis of arms 13 and 14 such that apex 16 is offset with respect to the longitudinal axis defined by aligned depressions 10.

A split hinged sleeve 25 includes two half sleeve sections 26 and 27 which are pivotally attached to one another by hinges 28 and 29. A plurality of pairs of opposed wedges 30 and 31, 32 and 33, 34 and 35, are attached to sleeve sections 26 and 27, respectively. Two piece annular flanges 36 and 37, 38 and 39, 40 and 41, are also attached to sleeve sections 26 and 27 adjacent respective ones of the pairs of wedges. These flanges serve as additional structurally supporting elements for the attached wedge and serve the secondary purpose of uniformly transmitting to the attached sleeve section the forces exerted upon the pertaining wedge. It may be noted that the ends of these flanges in proximity to the hinge line of split sleeve 25 are configured to accommodate pivotal movement of the split sleeve sections.

The locations of wedges 30, 31, 32, 33, 34 and 35, with respct to split sleeve 25 correspond to the positions of roller bearing surfaces 21, 22, 23, 24, 17 and 18. By inspection, it may be appreciated that as frame 1 is repositioned with respect to split sleeve 25 by applying a pulling force upon the frame at apex 16, the roller bearing surfaces are urged toward the butt end of the wedges. The force exerted upon the wedges and transmitted to split sleeves 26 and 27 will force the sleeves toward one another and exert a compressive force upon a wire or cable 7 lodged therein. A continuingly applied pulling force at apex 16 will cause cable 7 to be placed in tension commensurate with the force applied.

Whenever cable 7 to be pulled is of a diameter substantially less than the internal diameter of split sleeve 25, an insert, such as insert 45 may be employed. Insert 45 is formed by a pair of split sleeves 46, 47 which have an external radius approximately corresponding to the internal diameter of split sleeve 25 and an internal radius approximately corresponding to the diameter of